United States Patent
Yang

(10) Patent No.: US 10,209,998 B2
(45) Date of Patent: Feb. 19, 2019

(54) MULTI-THREADING PROCESSOR AND A SCHEDULING METHOD THEREOF

(71) Applicant: VIA Alliance Semiconductor Co., Ltd., Shanghai (CN)

(72) Inventor: Meng-Chen Yang, Beijing (CN)

(73) Assignee: VIA ALLIANCE SEMICONDUCTOR CO., LTD., Shanghai (CN)

( * ) Notice: Subject to any disclaimer, the term of this patent is extended or adjusted under 35 U.S.C. 154(b) by 238 days.

(21) Appl. No.: 15/229,529

(22) Filed: Aug. 5, 2016

(65) Prior Publication Data

US 2017/0364361 A1    Dec. 21, 2017

(30) Foreign Application Priority Data

Jun. 17, 2016  (CN) .......................... 2016 1 0435604

(51) Int. Cl.
| | |
|---|---|
| *G06F 9/38* | (2018.01) |
| *G06F 9/30* | (2018.01) |
| *G06F 9/48* | (2006.01) |

(52) U.S. Cl.
CPC ........ *G06F 9/3851* (2013.01); *G06F 9/30145* (2013.01); *G06F 9/3857* (2013.01); *G06F 9/4881* (2013.01)

(58) Field of Classification Search
None
See application file for complete search history.

(56) References Cited

U.S. PATENT DOCUMENTS

| | | | |
|---|---|---|---|
| 2001/0056456 A1* | 12/2001 | Cota-Robles | G06F 9/3851 718/103 |
| 2003/0018687 A1 | 1/2003 | Kalafatis et al. | |
| 2009/0157359 A1* | 6/2009 | Chernoff | G06F 9/542 702/186 |
| 2010/0031006 A1* | 2/2010 | El-Essawy | G06F 9/3851 712/206 |
| 2014/0181484 A1* | 6/2014 | Callister | G06F 9/3851 712/229 |

FOREIGN PATENT DOCUMENTS

| | | |
|---|---|---|
| CN | 1645317 A | 7/2005 |
| CN | 102906696 A | 1/2013 |
| WO | WO 2011/120019 A2 | 9/2011 |

\* cited by examiner

*Primary Examiner* — John M Lindlof
(74) *Attorney, Agent, or Firm* — McClure, Qualey & Rodack, LLP

(57) ABSTRACT

A processor includes an execution unit, a retirement module, a first retirement counter, a second retirement counter, and an adjustment module. The execution unit executes instructions of a first thread and a second thread by simultaneous multithreading. The retirement module retires the executed instructions of the first thread in order of the first-thread instruction sequence, and retires the executed instructions of the second thread in order of the second-thread instruction sequence. The first retirement counter determines a first multi-thread retirement rate of the first thread. The second retirement counter determines a second multi-thread retirement rate of the second thread. The adjustment module adjusts the proportions of hardware resources respectively occupied by the first thread and the second thread according to the first multi-thread retirement rate and the second multi-thread retirement rate, so that the processor executes at its most efficient level of performance.

20 Claims, 3 Drawing Sheets

MULTI-THREADING PROCESSOR AND A SCHEDULING METHOD THEREOF

CROSS REFERENCE TO RELATED APPLICATIONS

This application claims priority of China Patent Application No. 201610435604.8, filed on Jun. 17, 2016, the entirety of which is incorporated by reference herein.

BACKGROUND OF THE INVENTION

Field of the Invention

The disclosure relates generally to multithreading processors and allocate methods thereof, and more particularly it relates to processors for simultaneous multithreading and allocate methods thereof.

Description of the Related Art

Multi-threading is defined as a process whereby a physical processor simultaneously executes multiple threads, meaning that the physical core of the processor may be viewed as multiple logical cores being executed in parallel using multi-threading techniques. When multiple threads are executed by the resources of a single processor at the same time, the resources of a processor could be more efficiently allocated through simultaneous multithreading. Multiple threads could be executed simultaneously on a single processor by simultaneous multithreading, so that the powerful hardware resources of a modern processor, such as a decode unit, reservation station, and execution unit (such as the floating point unit, the fixed point instruction unit, the load/store unit, etc.), do not stay idle, and hence the efficiency of the processor can be improved.

When a processor is engaged in simultaneous multithreading, the hardware resources are mostly allocated by the rule of First-Come-First-Served (FCFS) Scheduling, or else the hardware resources are allocated equally to each thread. However, the static allocate method may not be suitable for some software applications. Therefore, the resources of a simultaneous multithreading processor should be allocated efficiently to improve the execution efficiency of the processor.

BRIEF SUMMARY OF THE INVENTION

In an embodiment, a processor comprises an execution unit, a retirement module, a first retirement counter, a second retirement counter, and an adjustment module. The execution unit is configured to execute instructions of a first thread and instructions of a second thread by simultaneous multi-threading. The retirement module has retired the executed instructions of the first thread in order of the instruction sequence of the first thread and retires the executed instructions of the second thread in order of the instruction sequence of the second thread. The first retirement counter is configured to count the first multi-thread retirement rate of the instructions of the first thread. The second retirement counter is configured to count the second multi-thread retirement rate of the instructions of the second thread. The adjustment module adjusts the proportions of hardware resources of the processor respectively occupied by the first thread and the second thread according to the first multi-thread retirement rate and the second multi-thread retirement rate, so that the processor runs efficiently.

In an embodiment, a scheduling method adapted for execution by a processor by simultaneous multithreading comprises: executing instructions of a first thread and instructions of a second thread by simultaneous multithreading; retiring the executed instructions of the first thread in order of the instruction sequence of the first thread and retiring the executed instructions of the second thread in order of the instruction sequence of the second thread; counting the first multi-thread retirement rate of the instructions of the first thread using a first retirement counter; counting the second multi-thread retirement rate of the instructions of the second thread using a second retirement counter; and adjusting the proportions of hardware resources of the processor respectively occupied by the first thread and the second thread according to the first multi-thread retirement rate and the second multi-thread retirement rate, so that the processor runs efficiently.

The processors and the scheduling methods thereof provided in the invention actually count the retirement rate of each thread and dynamically allocate the hardware resources of the processor according to the counted retirement rate, so as to make the processor runs most efficiently. Since the multi-thread retirement rates of different threads can vary with different combinations of threads executed by simultaneous multithreading, there are several control logics built into the adjustment module of the processor provided in the invention to allocate the hardware resources, and it is more flexible to select a different control logic according to the retirement rates of different threads.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

Figure 1:
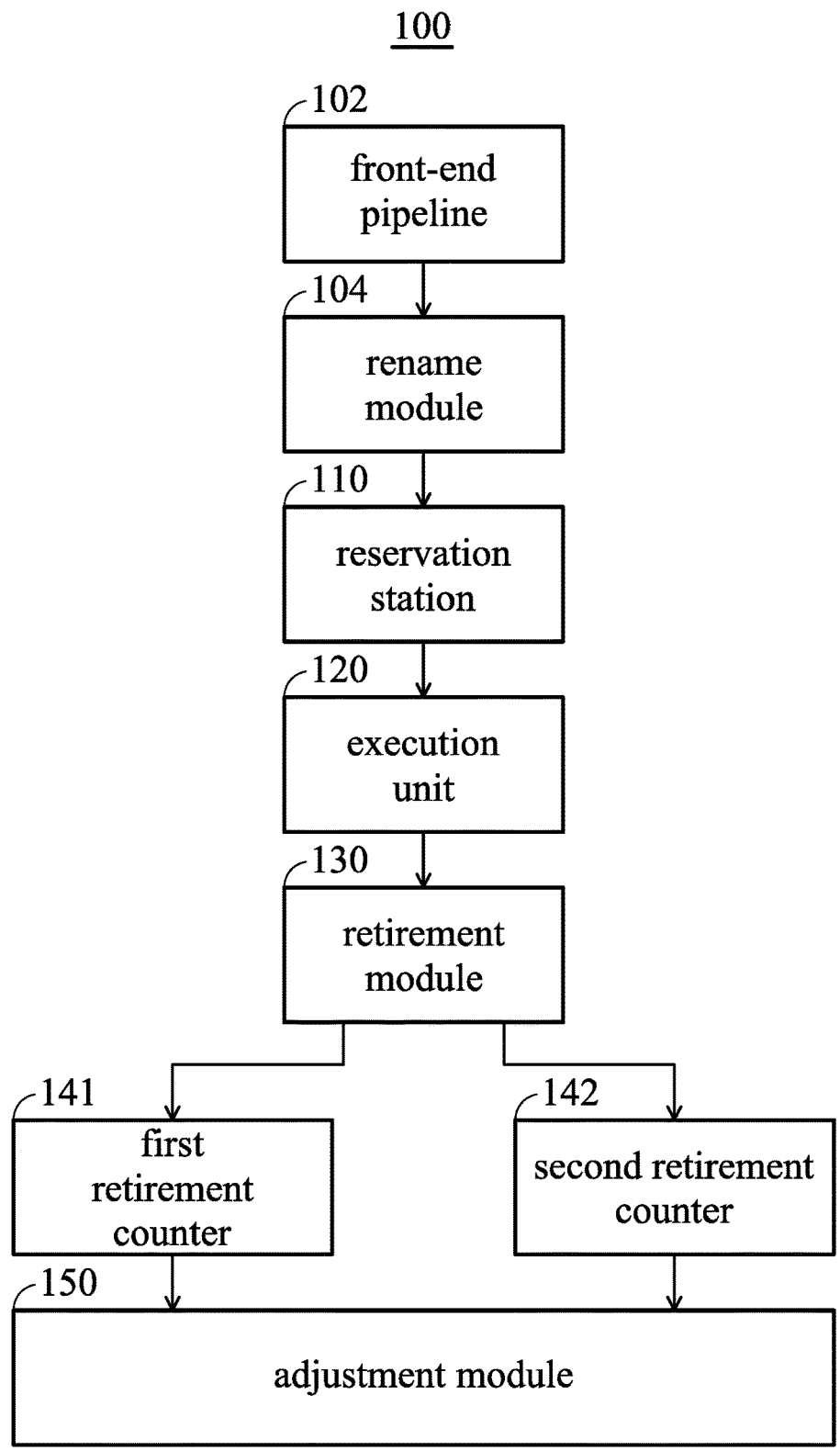
FIG. 1 is a block diagram of a processor in accordance with an embodiment of the invention.

This description is made for the purpose of illustrating the general principles of the invention and should not be taken in a limiting sense. In addition, the present disclosure may repeat reference numerals and/or letters in the various examples. This repetition is for the purpose of simplicity and clarity and does not in itself dictate a relationship between the various embodiments and/or configurations discussed. The scope of the invention is best determined by reference to the appended claims.

It should be understood that the following disclosure provides many different embodiments, or examples, for implementing different features of the application. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Moreover, the formation of a feature on, connected to, and/or coupled to another feature in the present disclosure that follows may include embodiments in which the features are formed in direct contact, and may also include embodiments in which additional features may be formed interposing the features, such that the features may not be in direct contact.

FIG. 1 is a block diagram of a processor in accordance with an embodiment of the invention. As shown in FIG. 1, the processor 100 includes an execution unit 120, a retirement module 130, a first retirement counter 141, a second retirement counter 142, and an adjustment module 150, wherein the processor 100 is configured to execute by simultaneous multithreading.

According to an embodiment of the processor 100 being a superscalar pipeline (out-of-order execution) processor, the processor 100 further includes a front-end pipeline 102, a rename module 104, and a reservation station 110, in which the front-end pipeline 102 further includes, for example, a instruction cache, a fetch and decode module, etc. The instruction cache is configured to cache the macro-instructions of multiple threads, such as the macro-instructions in the x86 instruction set architecture or any other instruction set architecture. The fetch and decode module is configured to receive the macro-instructions of the multiple threads and translate them into the micro-instructions (or micro-operations, or "μops"). The instructions of the multiple threads are provided for the rename module 104, and the rename module 104 generates the dependency of the micro-instructions and issues the micro-instructions (called "instructions" hereinafter) to the reservation station 110 according to the instruction sequence of each thread. The reservation station 110 dispatches the instructions to the proper one of a plurality of execution units 120 out of order. Specifically, when the instructions are ready to be executed, each queue of the reservation station 110 schedules and dispatches the instructions to the corresponding execution units 120. It should be noted that, in an out-of-order execution processor, the instructions in (and before) the rename module 104 are executed according to the instruction order of each thread, while the instructions in the reservation station 110 and the execution unit 120 are executed out of order. That is, the reservation station 110 dispatches the instruction, whose operand is ready first, to the execution unit 120 for execution, so that the previous instruction order of each thread has been broken down.

The execution unit 120 is configured to execute the instructions of the first-thread and the second thread of a plurality of threads by simultaneous multithreading. After an instruction of the first thread is executed by the execution unit 120, the retirement module 130 retires the executed first-thread instruction according to the order of the instruction sequence of the first thread. Similarly, after an instruction of the second thread is executed by the execution unit 120, the retirement module 130 retires the executed instructions of the second thread according to the order of the instruction sequence of the second thread. According to other embodiments of the invention, the retirement module 130 further records related information about each of the instructions issued from the rename module 104 (such as the order of the instruction sequences of the first and second threads) to ensure that the instructions executed by the execution unit 120 out of order can be retired in order of the previous instruction sequences of the first and second threads.

According to other embodiments of the invention, the processor 100 could execute any number of threads by simultaneous multithreading. For the sake of explaining the invention in detail, the processor 100 is illustrated herein as executing the first thread and the second thread, but it is not limited thereto.

The first retirement counter 141 determines the first multi-thread retirement rate of the instructions of the first thread, and the second retirement counter 142 determines the second multi-thread retirement rate of the instructions of the second thread. According to an embodiment of the invention, the retirement module 130 determines whether the retired instruction belongs to either the first thread or the second thread and informs the corresponding first retirement counter 141 or second retirement counter 142. As stated above, according to the embodiment of the processor 100 being a superscalar pipeline (executing out of order) processor, the retirement module 130 records related information about each of the instructions (such as which thread the instruction belongs to, and the order of the instruction sequences of the first and second threads). When the instructions are retired by the retirement module 130 according to the original order of the instruction sequences of the first thread and the second thread, the retirement module 130 informs the first retirement counter 141 or the second retirement counter 142 according to the retired instruction belonging to the first thread or the second thread. For example, when the retired instruction belongs to the first thread, the first retirement counter 141 is informed to add 1; when the retired instruction belongs to the second thread, the second retirement counter 142 is informed to add 1.

The adjustment module 150 uses the first multi-thread retirement rate determined by the first retirement counter 141 and the second multi-thread retirement rate determined by the second retirement counter 142 to adjust the proportions of the hardware resources of the processor 100 respectively occupied by the first thread and the second thread, so that the processor 100 executes at its most efficient level of performance.

According to an embodiment of the invention, the resources of the processor 100 include the resources of the rename module 104, the reservation station 110, or the retirement module 130. According to an embodiment of the invention, the resources of the reservation station 110 are taken as an example of the hardware resources of the processor 100. The adjustment module 150 adjusts the proportions of the RS queues in the reservation station 110 respectively allocated to the first thread and the second thread, according to the first multi-thread retirement rate and the second multi-thread retirement rate. According to another embodiment of the invention, the resources of the retirement module 130 are taken as an example of the hardware resources of the processor 100. The adjustment module 150 adjusts the proportions of the reorder buffer (ROB) in the retirement module 130 respectively occupied by the first thread and the second thread, according to the first multi-thread retirement rate and the second multi-thread retirement rate. According to yet another embodiment of the invention, the resources of the rename module 104 are taken as an example of the hardware resources of the processor 100. The adjustment module 150 adjusts the proportions of the resources (such as physical registers) of the register alias table (RAT) in the rename module 104 respectively occupied by the first thread and the second thread, according to the first multi-thread retirement rate and the second multi-thread retirement rate.

Figure 2:
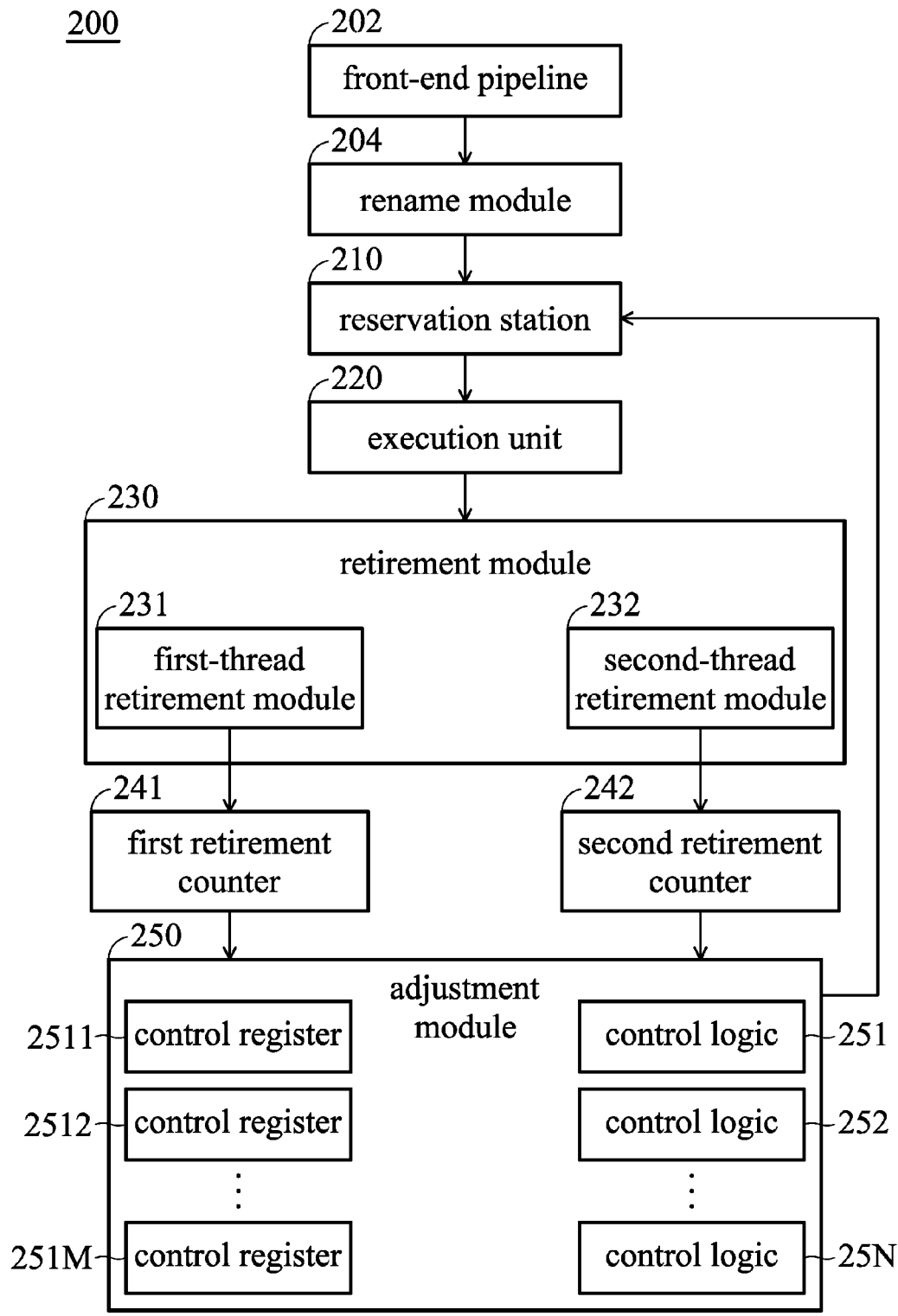
FIG. 2 is a block diagram of a processor in accordance with another embodiment of the invention.

FIG. 2 is a block diagram of a processor in accordance with another embodiment of the invention. As shown in FIG. 2, the processor 200 includes the reservation station 210, the execution unit 220, the retirement module 230, the first retirement counter 241, the second retirement counter 242, and the adjustment module 250 including a plurality of control logics 251~25N. According to an embodiment of the processor 200 being a superscalar pipeline (executing out of order) processor, the processor 200 further includes the front-end pipeline 202, the rename module 204, and the reservation station 210, in which the front-end pipeline 202, the rename module 204, the reservation station 210, the execution unit 220, the retirement module 230, the first retirement counter 241, the second retirement counter 242, and the adjustment module 250 respectively correspond to the front-end pipeline 102, the rename module 104, the reservation station 110, the execution unit 120, the retirement module 130, the first retirement counter 141, the second retirement counter 142, and the adjustment module 150 in FIG. 1.

According to an embodiment of the invention, the retirement module 230 further includes the first-thread retirement module 231 and the second-thread retirement module 232 which respectively retire the first-thread instructions and the second-thread instructions. The first retirement counter 241 determines the first number of instructions those have been retired by the first-thread retirement module 231 in the first predetermined number of clock cycles, in which the adjustment module 250 divides the first number by the first predetermined number to get the first multi-thread retirement rate. That is, the first multi-thread retirement rate represents the average number of instructions in the first thread that are retired in each clock cycle.

Similarly, the second retirement counter 242 is configured to determine a second number of instructions those have been retired by the second-thread retirement module 232 in the second predetermined number of clock cycles, in which the adjustment module 250 divides the second number by the second predetermined number to get the second multi-thread retirement rate. That is, the second multi-thread retirement rate represents the average number of instructions in the second thread that are retired in each clock cycle.

It should be noted that the first-thread retirement module 231 and the second-thread retirement module 232 are the same circuit, physically sharing the input and output of the retirement module 230. As stated above, the retirement module 230 determines, according to the recorded information related to the instructions, whether the retired instruction belongs to the first thread or the second thread and then informs the first retirement counter 141 or the second retirement counter 142 to count.

According to an embodiment of the invention, the first predetermined number may or may not be equal to the second predetermined number. According to an embodiment of the invention, the first retirement counter 241 and the second retirement counter 242 could periodically be reset.

According to an embodiment of the invention, the adjustment module 250 further includes N control logics 251~25N. The adjustment module 150 or 250 selects at least one of the control logics 251~25N according to the first multi-thread retirement rate and the second multi-thread retirement rate and the proportions of the hardware resources respectively occupied by the first thread and the second thread are adjusted according to the selected control logic, so that the hardware resources are evenly shared by the first thread and the second thread in order to achieve the maximal execution efficiency of the processor 100 of FIG. 1 and the processor 200 of FIG. 2. According to an embodiment of the control logics 251~25N, the faster the multi-thread retirement rate of a thread is, the more hardware resources (such as the RS queues of the reservation station) the thread is allocated to. According to another embodiment of the control logic 251~25N, the faster the multi-thread retirement rate of a thread is, the less hardware resources the thread is allocated to. According to yet another embodiment of the control logics 251~25N, the proportion of the hardware resources occupied by each thread is limited by a threshold which includes the upper boundary and/or the lower boundary. For example, the reservation station 210 has 30 RS queues in total. It is assumed that the lower boundary of the first thread is set to 7. When the second thread has occupied 23 RS queues, the processor 200 stops the front-end pipeline 202 further fetching the second-thread instructions instead of allocating more RS queues to the instructions of the second thread, even though there are still more second-thread instructions issued from the rename module 204 to the reservation station 210. It is assumed that the upper boundary of the first thread is set to 15. When the first thread has occupied 15 RS queues, the processor 200 stops the front-end pipeline 202 further fetching the first-thread instructions instead of allocating more RS queues to the instructions of the first thread, even though there are still more first-thread instructions issued from the rename module 204 to the reservation station 210. According to yet another embodiment of the control logics 251~25N, the hardware resources are allocated to the threads requiring the resources by arbitrary distribution, in which the arbitrary distribution means that the hardware resources are freely allocated instead of allocated according to the multi-thread retirement rates.

According to an embodiment of the invention, the adjustment module 150 in FIG. 1 and the adjustment module 250 in FIG. 2 further calculate the first fairness coefficient and the second fairness coefficient according to the first multi-thread retirement rate and the second multi-thread retirement rate, and adjust the proportions of the hardware resources respectively occupied by the first thread and the second thread. The fairness coefficient A is expressed by Eq. 1, in which $R_{0,T1}$ is the first single-thread retirement rate, $R_{0,T2}$ is the second single-thread retirement rate, $R_{SMT,T1}$ is the first multi-thread (SMT) retirement rate, and $R_{SMT,T2}$ is the second multi-thread (SMT) retirement rate.

$$A = \frac{R_{0,T1}}{R_{SMT,T1}} + \frac{R_{0,T2}}{R_{SMT,T2}} \quad \text{(Eq. 1)}$$

The first single-thread retirement rate $R_{0,T1}$ means the average number of first-thread instructions retired by the retirement module 130 or 230 in each clock cycle when the execution unit 120 in FIG. 1 or the execution unit 220 in FIG. 2 executes the first-thread instructions by single-threading. Similarly, the second single-thread retirement rate $R_{0,T2}$ means the average number of second-thread instructions retired by the retirement module 130 or 230 in each clock cycle when the execution unit 120 in FIG. 1 or the execution unit 220 in FIG. 2 executes the second-thread instructions by single-threading. Since the execution unit 120 in FIG. 1 and the execution unit 220 in FIG. 2 have to devote all resources to the first thread or the second thread during single-threading, the single-thread retirement rate must exceed the corresponding multi-thread retirement rate. That is, the first single-thread retirement rate $R_{0,T1}$ exceeds the first multi-thread retirement rate $R_{SMT,T1}$, and the second single-thread retirement rate $R_{0,T2}$ exceeds the second multi-thread retirement rate $R_{SMT,T2}$.

The first fairness coefficient is the first single-thread retirement rate $R_{0,T1}$ divided by the first multi-thread retirement rate $R_{SMT,T1}$, and the second fairness coefficient is the second single-thread retirement rate $R_{0,T2}$ divided by the second multi-thread retirement rate $R_{SMT,T2}$. For the sake of the processor 100 in FIG. 1 and the processor 200 in FIG. 2 running efficiently by simultaneous multithreading, each of the adjustment module 150 in FIG. 1 and the adjustment module 250 in FIG. 2 is configured to adjust the proportions of the hardware resources in the processor 100 or 200 respectively occupied by the first thread and the second thread, so that the fairness coefficient A is as low as possible. The invention is not intended to be limited by taking the fairness coefficient A as the criteria of judgment for balancing the first thread and the second thread to share the hardware resources, and any other criteria of judgment may be employed. According to an embodiment of the invention, as shown in FIG. 2, the adjustment module 250 further includes N control logics 251~25N. The adjustment module 150 or 250 selects at least one of the control logics 251~25N. For example, when the selected control logic is to minimize the fairness coefficient A, the adjustment module 150 or 250 allocates, according to the selected control logic, the hardware resources for the first thread and the second thread evenly sharing the hardware resources, and the maximum efficiency of the execution of the processor 100 in FIG. 1 and the processor 200 in FIG. is then achieved.

According to an embodiment of the invention, the adjustment module 150 in FIG. 1 and the adjustment module 250 in FIG. 2 further include M control registers 2511~251M, in which the control registers 2511~251M are configured to enable and to disable the corresponding control logics 251~25N. According to an embodiment of the invention, M is equal to N, but the invention is not limited thereto. M could be less than N. According to an embodiment of the invention, the adjustment module 150 in FIG. 1 and the adjustment module 250 in FIG. 2 set the control registers 2511~251M to select one or some of the control logics 251~25N, so that the proportions of the hardware resources occupied by the first thread and the second thread are adjusted by the selected control logics. According to other embodiments of the invention, the user (if it is available for the user to select), a program developer, or an adjustment program, which is able to automatically calculate the fairness coefficient, sets the control registers 2511~251M for selecting one or some of the corresponding control logics 251~25N through a write instruction of Model Specific Register (MSR) (Write MSR), and the proportions of the hardware resources respectively occupied by the first thread and the second thread are then adjusted by the selected control logics. For example, the adjustment module 150 or 250 (or the user, the program developer, or an adjustment program) calculates the fairness coefficient A by the first multi-thread retirement rate, the second multi-thread retirement rate, the first single-thread retirement rate, and the second single-thread retirement rate, which are determined according to the multiple threads executed by simultaneous multithreading, and selects a control logic, which is configured to minimize the fairness coefficient A, among the control logics 251~25N. When executing the first thread and the second thread by simultaneous multithreading, the selected control logic allocates the hardware resources (such as RS queues).

Figure 3:
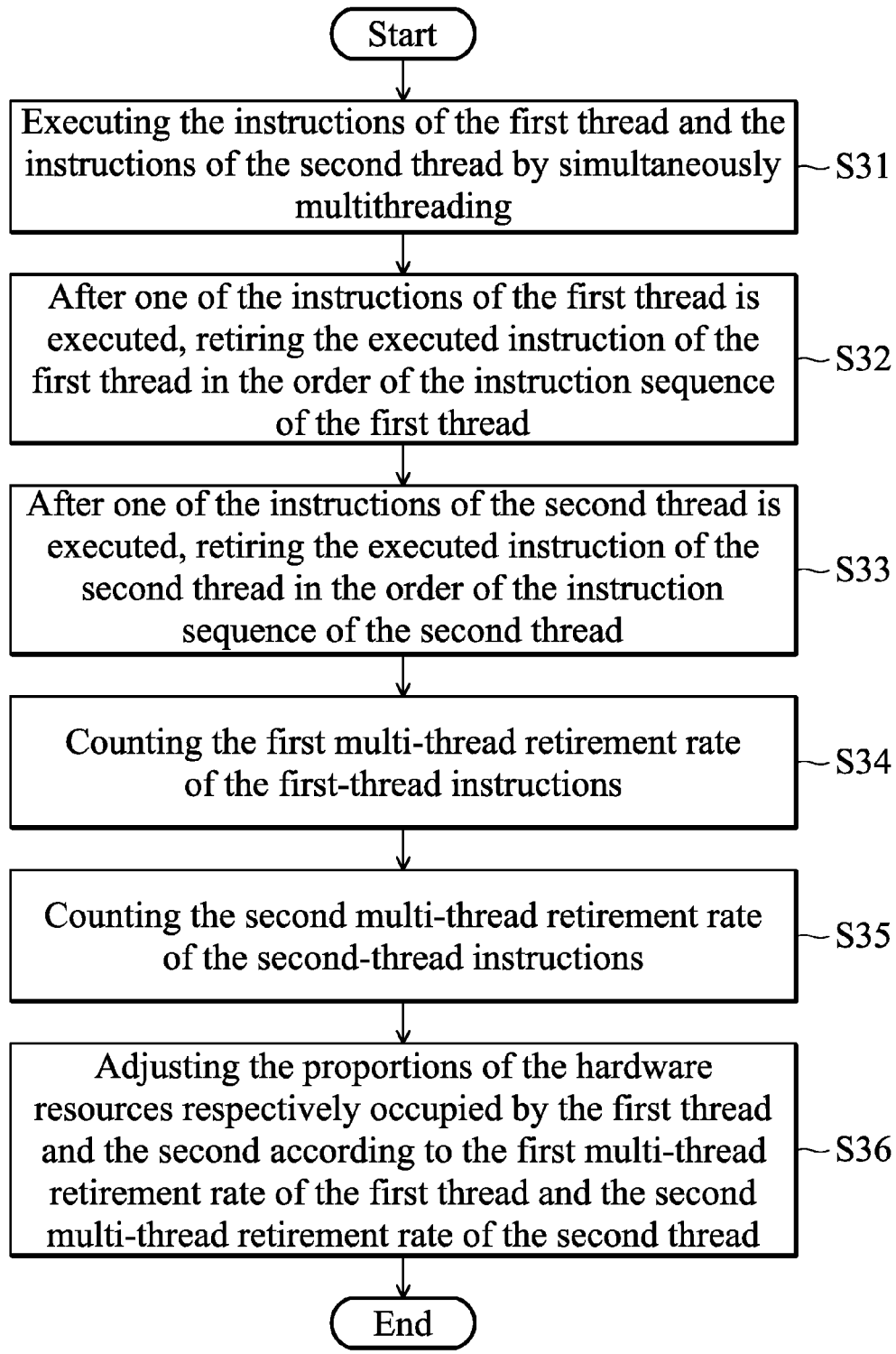
FIG. 3 is a flow chart of a allocate method in accordance with an embodiment of the invention.

FIG. 3 is a flow chart of a allocate method in accordance with an embodiment of the invention. As shown in FIG. 3, the first-thread instructions and the second-thread instructions are executed by simultaneous multithreading (Step S31). After one of the first-thread instructions is executed, the executed instruction of the first thread is retired in the order of the instruction sequence of the first thread (Step S32). After one of the second-thread instructions is executed, the executed instruction of the second thread is retired in the order of the instruction sequence of the second thread (Step S33). It should be noted that there is no particular order between Step S32 and Step S33. The first multi-thread retirement rate of the first-thread instructions is determined (Step S34), and the second multi-thread retirement rate of the second-thread instructions is determined (Step S35). The proportions of the hardware resources occupied by the first thread and the second are respectively adjusted according to the first multi-thread retirement rate of the first thread and the second multi-thread retirement rate of the second thread (Step S36), so that the processor executes at its most efficient level of performance.

The processors and the scheduling methods thereof provided in the invention actually determine the retirement rate of each thread and dynamically allocate the hardware resources of the processor according to the determined retirement rate, so that the processor executes at its most efficient level of performance. Since the multi-thread retirement rates of different threads can vary with different combinations of threads executed by simultaneous multithreading, there are several control logics built into the adjustment module of the processor provided in the invention to allocate the hardware resources, and it is more flexible to select a different control logic according to the retirement rates of different threads.

While the invention has been described by way of example and in terms of preferred embodiment, it should be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:
1. A processor, comprising:
an execution unit, configured to execute instructions of a first thread and instructions of a second thread by simultaneous multithreading;
a retirement module, retiring the executed instructions of the first thread in order of an instruction sequence of the first thread and retiring the executed instructions of the second thread in order of an instruction sequence of the second thread;
a first retirement counter, configured to determine a first multi-thread retirement rate and a first single-thread retirement rate of the instructions of the first thread;
a second retirement counter, configured to determine a second multi-thread retirement rate and a second single-thread retirement rate of the instructions of the second thread; and
an adjustment module, adjusting proportions of hardware resources of the processor respectively occupied by the first thread and the second thread according to the first multi-thread retirement rate, the first single-thread retirement rate, the second multi-thread retirement rate, and the second single-thread retirement rate, so that the hardware resources of the processor are evenly shared by the first thread and the second thread,
wherein the first single-thread retirement rate is an average number of the instructions of the first thread retired by the retirement module in each clock cycle when the execution unit executes the instructions of the first thread by single-threading, wherein the second single-thread retirement rate is an average number of the instructions of the second thread retired by the retire- ment module in each clock cycle when the execution unit executes the instructions of the second thread by single-threading.

2. The processor of claim 1, wherein the first retirement counter counts that the retirement module has retired a first number of instructions of the first thread within a first predetermined number of clock cycles, wherein the first multi-thread retirement rate is the first number divided by the first predetermined number, wherein the second retirement counter counts that the retirement module has retired a second number of instructions of the second thread within a second predetermined number of clock cycles, wherein the second multi-thread retirement rate is the second number divided by the second predetermined number.

3. The processor of claim 1, wherein the retirement module determines whether a retired instruction belongs to the first thread or the second thread and informs the corresponding first retirement counter or second retirement counter.

4. The processor of claim 1, wherein the adjustment module adjusts the proportions of the hardware resources respectively occupied by the first thread and the second thread according to a sum of a first fairness coefficient and a second fairness coefficient, wherein the first fairness coefficient is the first single-thread retirement rate divided by the first multi-thread retirement rate, and the second fairness coefficient is the second single-thread retirement rate divided by the second multi-thread retirement rate.

5. The processor of claim 4, wherein the adjustment module adjusts the proportions of the hardware resources respectively occupied by the first thread and the second thread to minimize the sum of the first fairness coefficient and the second fairness coefficient as much as possible.

6. The processor of claim 4, wherein the adjustment module comprises a plurality of control logics, wherein the adjustment module selects one or some of the control logics configured to minimize the sum of the first fairness coefficient and the second fairness coefficient and adjusts the proportions of the hardware resources respectively occupied by the first thread and the second thread according to the selected control logics.

7. The processor of claim 1, wherein the adjustment module comprises a plurality of control logics, wherein the adjustment module selects at least one of the control logics and adjusts the proportions of the hardware resources respectively occupied by the first thread and the second thread according to the selected control logic.

8. The processor of claim 7, wherein the adjustment module comprises a plurality of control registers configured to enable and disable the control logics, wherein a user sets the control registers through a write instruction of a Model Specific Register (MSR) in order to select the selected control logic.

9. The processor of claim 1, wherein the adjustment module comprises a plurality of control registers, wherein the adjustment module adjusts thresholds of the proportions of the hardware resources respectively occupied by the first thread and the second thread by setting the control registers.

10. The processor of claim 1, wherein the hardware resources comprise resources of a rename module, a reservation station, or a retirement module.

11. A scheduling method adapted for a processor to execute by simultaneous multithreading, comprising:
executing instructions of a first thread and instructions of a second thread by simultaneous multithreading;
retiring the executed instructions of the first thread in order of an instruction sequence of the first thread and retiring the executed instructions of the second thread in order of an instruction sequence of the second thread;
determining a first multi-thread retirement rate and a first single-thread retirement rate of the instructions of the first thread using a first retirement counter;
determining a second multi-thread retirement rate and a second single-thread retirement rate of the instructions of the second thread using a second retirement counter; and
adjusting proportions of hardware resources of the processor respectively occupied by the first thread and the second thread according to the first multi-thread retirement rate, the first single-thread retirement rate, the second multi-thread retirement rate and the second single-thread retirement rate, so that the hardware resources of the processor are evenly shared by the first thread and the second thread,
wherein the first single-thread retirement rate is an average number of the instructions of the first thread retired by the retirement module in each clock cycle when the execution unit executes the instructions of the first thread by single-threading, wherein the second single-thread retirement rate is an average number of the instructions of the second thread retired by the retirement module in each clock cycle when the execution unit executes the instructions of the second thread by single-threading.

12. The scheduling method of claim 11, further comprising:
counting a first number of the instructions of the first thread those have been retired within a first predetermined number of clock cycles using the first retirement counter, wherein the first multi-thread retirement rate is the first number divided by the first predetermined number; and
counting a second number of instructions of the second thread those have been retired within a second predetermined number of clock cycles using the second retirement counter, wherein the second multi-thread retirement rate is the second number divided by the second predetermined number.

13. The scheduling method of claim 11, further comprising:
determining whether a retired instruction belongs to the first thread or the second thread; and
informing the corresponding first retirement counter or second retirement counter.

14. The scheduling method of claim 11, wherein the step of adjusting the proportions of the hardware resources of the processor respectively occupied by the first thread and the second thread according to the first multi-thread retirement rate and the second multi-thread retirement rate further comprises:
dividing the first single-thread retirement rate by the first multi-thread retirement rate to obtain a first fairness coefficient;
dividing the second single-thread retirement rate by the second multi-thread retirement rate to obtain a second fairness coefficient; and
adjusting the proportions of the hardware resources respectively occupied by the first thread and the second thread according to a sum of the first fairness coefficient and the second fairness coefficient.

15. The scheduling method of claim 14, wherein the step of adjusting the proportions of the hardware resources respectively occupied by the first thread and the second thread further comprises:

minimizing the sum of the first fairness coefficient and the second fairness coefficient as much as possible.

16. The scheduling method of claim 14, further comprising:

selecting one or some of the control logics configured to minimize the sum of the first fairness coefficient and the second fairness coefficient; and adjusting the proportions of the hardware resources respectively occupied by the first thread and the second thread according to the selected control logics.

17. The scheduling method of claim 11, wherein the step of adjusting the proportions of the hardware resources respectively occupied by the first thread and the second thread according to the first multi-thread retirement rate and the second multi-thread retirement rate comprises:

selecting at least one of a plurality of control logics; and adjusting the proportions of the hardware resources respectively occupied by the first thread and the second thread according to the selected control logic.

18. The scheduling method of claim 17, wherein the step of selecting at least one of the control logics further comprises:

setting a plurality of control registers through a write instruction of a Model Specific Register (MSR) in order to select at least one of the control logics.

19. The scheduling method of claim 11, wherein the step of adjusting the proportions of the hardware resources respectively occupied by the first thread and the second thread according to the first multi-thread retirement rate and the second multi-thread retirement rate further comprises:

setting a plurality of control registers to adjust thresholds of the proportions of the hardware resources respectively occupied by the first thread and the second thread by setting the control registers.

20. The scheduling method of claim 11, wherein the hardware resources comprise resources of a rename module, a reservation station, or a retirement module.

* * * * *